United States Patent
Han et al.

(10) Patent No.: US 8,609,276 B2
(45) Date of Patent: Dec. 17, 2013

(54) BATTERY PACK

(75) Inventors: Jung-Yeop Han, Yongin-si (KR); Seung-Soo Jang, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 263 days.

(21) Appl. No.: 13/243,457

(22) Filed: Sep. 23, 2011

(65) Prior Publication Data

US 2012/0328908 A1    Dec. 27, 2012

Related U.S. Application Data

(60) Provisional application No. 61/500,341, filed on Jun. 23, 2011.

(51) Int. Cl.
*H01M 2/24*    (2006.01)

(52) U.S. Cl.
USPC ........... 429/158; 429/121; 429/123; 429/138; 429/160; 429/161; 429/170

(58) Field of Classification Search
USPC ........... 429/65, 121–123, 138, 158, 160–161, 429/163, 170, 178, 181, 211, 240
See application file for complete search history.

(56) References Cited

U.S. PATENT DOCUMENTS

| | | |
|---|---|---|
| 4,808,495 A | 2/1989 | Goldstein |
| 5,800,942 A | 9/1998 | Hamada et al. |
| 2009/0239137 A1* | 9/2009 | Kakuchi et al. ............... 429/151 |
| 2010/0143786 A1 | 6/2010 | Kim |
| 2010/0151312 A1 | 6/2010 | Kim et al. |
| 2011/0052960 A1 | 3/2011 | Kwon et al. |

FOREIGN PATENT DOCUMENTS

JP    10-334870    12/1998

* cited by examiner

*Primary Examiner* — Patrick Ryan
*Assistant Examiner* — Ben Lewis
(74) *Attorney, Agent, or Firm* — Robert E. Bushnell, Esq.

(57) ABSTRACT

A battery pack comprises a battery module disposed inside a case, the battery module including a plurality of battery units, each including first and second lead tabs which protrude outside of each battery unit and which have bent portions. An insulation plate includes a plurality of ribs, wherein the bent portions of the lead tabs extend over the ribs, and a plurality of bus bars are disposed over the lead tabs and electrically connect the battery units serially with each other, the bus bars being fixed to the ribs.

20 Claims, 10 Drawing Sheets

BATTERY PACK

CLAIM OF PRIORITY

This application makes reference to, incorporates the same herein, and claims all benefits accruing under 35 U.S.C. §119 from an application earlier filed in the U.S. Patent and Trademark Office on 23 Jun. 2011 and there duly assigned Ser. No. 61/500,341.

BACKGROUND OF THE INVENTION

1. Field of the Invention

One or more embodiments of the present invention relate to a battery pack.

2. Description of the Related Art

Secondary batteries refer to batteries capable of being charged or discharged unlike primary batteries that are not chargeable, and the secondary battery has been widely used not only for compact electronic devices such as mobile phones, personal digital assistants (PDAs), notebook computers, etc. but also for energy storage systems. During assembly or carrying of a secondary battery, a conductor may contact a terminal so that a positive electrode and a negative electrode are short-circuited, which may cause heating or firing of the secondary battery.

SUMMARY OF THE INVENTION

An exemplary embodiment of the present invention has been made in an effort to provide a battery module which is capable of stably connecting secondary batteries.

An exemplary embodiment of the present invention provides a battery module disposed inside a case, the battery module including a plurality of battery units, each including first and second lead tabs protruding outside of each battery unit, each of the first and second lead tabs having bent portions; an insulation plate connected to the case, the insulation plate including a plurality of first ribs, wherein the bent portions of the first and second lead tabs extend over the first ribs; and a plurality of bus bars disposed to cover each the lead tabs and electrically connect the battery units with each other, the bus bars being fixed to the first ribs.

The insulation plate may include at least one second rib, the plurality of first ribs extending orthogonally from the second rib, a plurality of openings outlined by the first ribs and the second rib, the first and second lead tabs extending through the openings and bent over adjacent ones of the first ribs, and a plurality of coupling holes formed in each of the first and second ribs, the bus bars being fixed to the first and second ribs.

Here, each battery unit may comprise a battery cell and a frame surrounding the battery cell, the first and second lead tabs extending from one side of the frame.

The plurality of bus bars may comprise a plurality of first bus bars having a first shape, a second bus bar having a second shape different from the first shape, and a third bus bar having a third shape different from the first and second shapes.

Here, each of the first bus bars may comprise a main body portion having at least one coupling hole therein, a cell balancing portion extending from a first end of the main body portion, the cell balancing portion having at least one coupling hole therein, a first side wall extending downwardly from a first side of the main body portion to wrap a predetermined one of the first lead tabs, and a second side wall extending downwardly from a second side of the main body portion to wrap a predetermined one of the second lead tabs.

Additionally, the second and third bus bars may comprise a main body portion each having at least one coupling hole therein, a cell balancing portion extending from a first end of the main body portion, the cell balancing portion having at least one coupling hole therein, a high current portion extending from a second end of the main body portion, and in a different plane than the main body portion, the high current portion having at least one coupling hole therein, and a single side wall extending downwardly from one side of the main body portion to wrap a predetermined respective ones of the first and second lead tabs.

Further, first and second terminal members may extend from the insulation plate to provide power externally from the battery pack, the first terminal member passing through the coupling hole of the high current portion of the second bus bar, and the second terminal member passing through the coupling hole of the high current portion of the third bus bar.

The battery pack may further comprise a printed circuit board providing information to a battery management system, the printed circuit board having a plurality of coupling holes for enabling the printed circuit board to be electrically connected to the plurality of bus bars and for enabling the printed circuit board to be fixed to the insulation plate. The printed circuit board being fixed to the second rib with a portion of each bus bar being fixed between the printed circuit board and the second rib.

The case of the battery pack may comprise a plurality of lateral surfaces surrounding the battery module, a first opening in a first one of the lateral surfaces and a second opening in a second one of the lateral surfaces, the first and second openings being parallel to each other to enable air to pass through the case, the air being channeled between each of the battery units.

According to an exemplary embodiment of the present invention a battery pack comprises a battery module disposed inside a case, the battery module including a plurality of battery units, each including first and second lead tabs protruding outside of each battery unit, each of the first and second lead tabs having bent portions, an insulation plate connected to the case, the insulation plate including a plurality of first ribs, wherein the bent portions of the first and second lead tabs extend over the first ribs, and a plurality of first bus bars disposed to respectively cover predetermined pairs of the first and second lead tabs and electrically connect the battery units with each other, the bus bars being fixed to the first ribs. A second bus bar may be disposed to cover a predetermined one of the first lead tabs, the second bus bar being further connected to a first external terminal. A third bus bar may be disposed to cover a predetermined one of the second lead tabs, the third bus bar being further connected to a second external terminal.

The case may comprise a plurality of lateral surfaces surrounding the battery module, a first opening in a first one of the lateral surfaces and a second opening in a second one of the lateral surfaces, the first and second openings being parallel to each other to enable air to pass through the case, the air being channeled between each of the battery units.

Here, each of the first bus bars may comprise a main body portion having at least one coupling hole therein, a cell balancing portion extending from a first end of the main body portion, the cell balancing portion having at least one coupling hole therein, a first side wall extending downwardly from a first side of the main body portion to wrap a predetermined one of the first lead tabs, and a second side wall extending downwardly from a second side of the main body portion to wrap a predetermined one of the second lead tabs.

Additionally, the second and third bus bars may comprise a main body portion each having at least one coupling hole therein, a cell balancing portion extending from a first end of the main body portion, the cell balancing portion having at least one coupling hole therein, a high current portion extending from a second end of the main body portion, and in a different plane than the main body portion, the high current portion having at least one coupling hole therein, and a single side wall extending downwardly from one side of the main body portion to wrap a predetermined respective ones of the first and second lead tabs.

Further, first and second terminal members may extend from the insulation plate to provide power externally from the battery pack, the first terminal member passing through the coupling hole of the high current portion of the second bus bar, and the second terminal member passing through the coupling hole of the high current portion of the third bus bar.

The battery pack may further comprise a printed circuit board providing information to a battery management system, the printed circuit board having a plurality of coupling holes for enabling the printed circuit board to be electrically connected to the plurality of bus bars and for enabling the printed circuit board to be fixed to the insulation plate. The printed circuit board being fixed to the second rib with a portion of each bus bar being fixed between the printed circuit board and the second rib.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
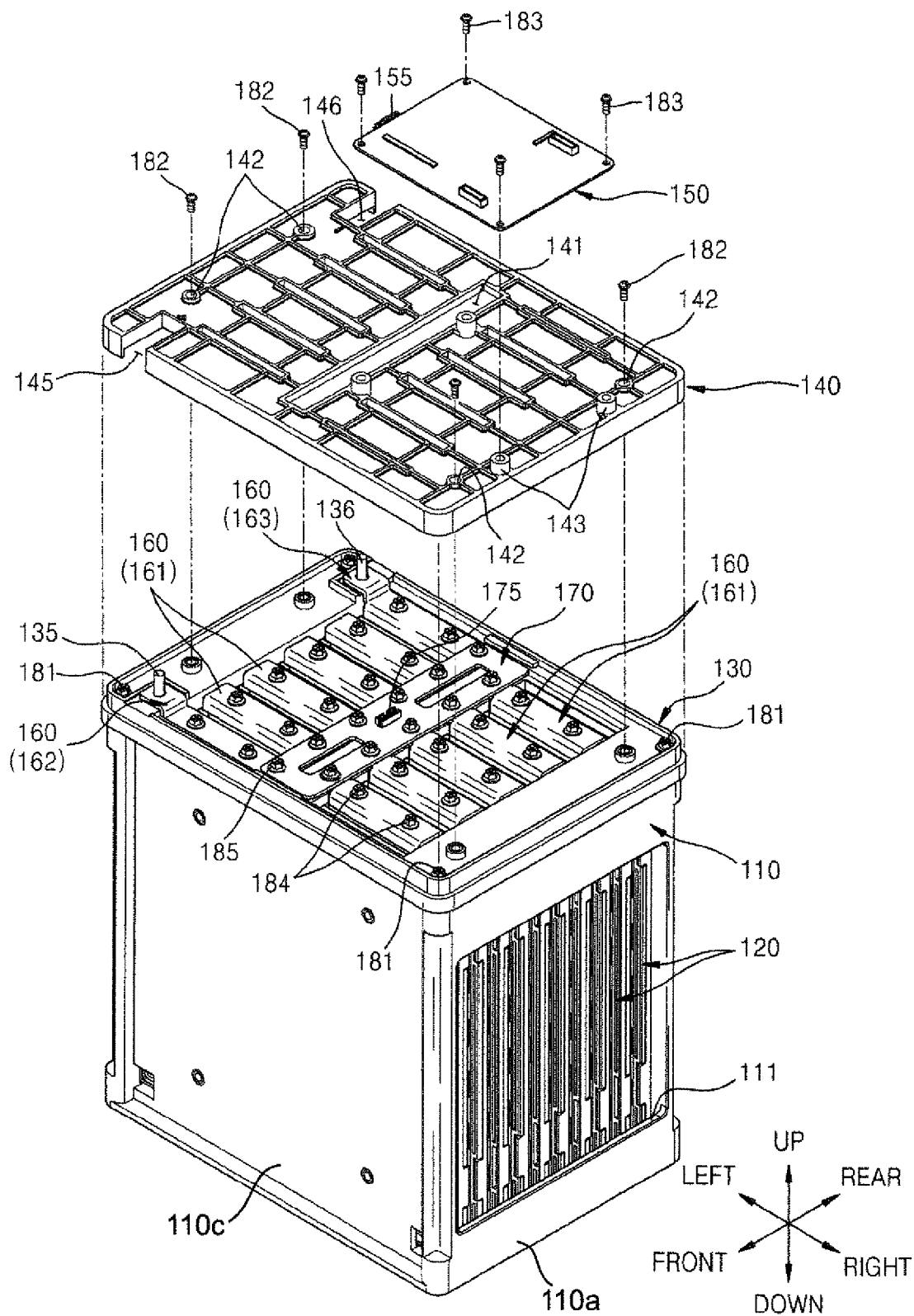
FIG. 1 is a perspective view schematically illustrating a battery pack according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. The spirit and scope of the present invention is defined by the following claims. In the meantime, the terms used in the present specification are used for explaining a specific exemplary embodiment, not limiting the present inventive concept. Thus, the expression of singularity in the present specification includes the expression of plurality unless clearly specified otherwise in context. Also, the terms such as "comprise" and/or "comprising" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof. In the present specification, the terms such as "first" and "second" are used herein merely to describe a variety of members, parts, areas, layers, and/or portions, but the constituent elements are not limited by the terms. The terms are used only for the purpose of distinguishing one constituent element from another constituent element. To help understanding of the invention, like reference numerals refer to like elements throughout.

Figure 2:
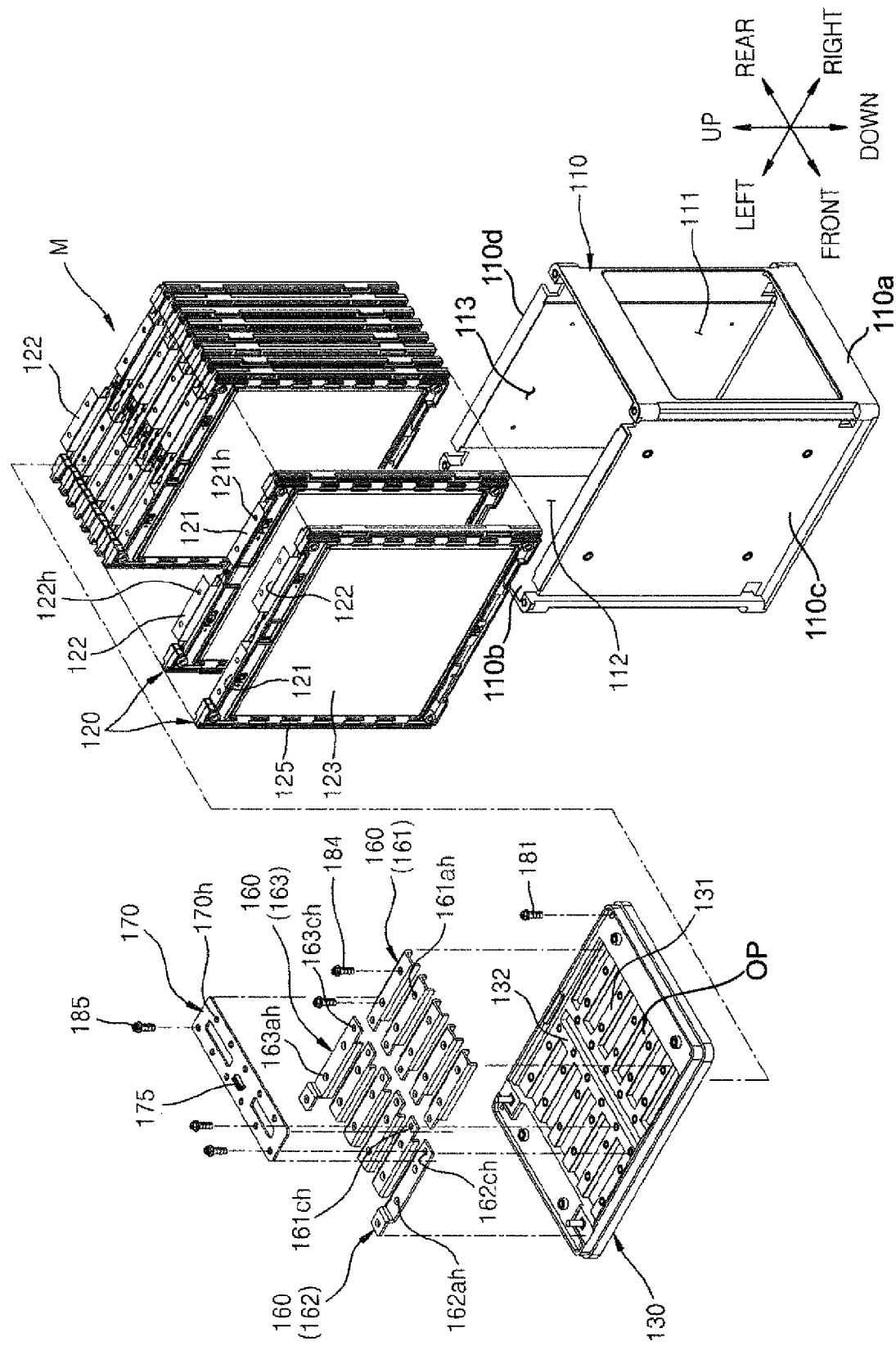
FIG. 2 is an exploded perspective view schematically illustrating constituent elements of the battery pack of FIG. 1, except for an insulation cover and a battery management system (BMS)

FIG. 1 is a perspective view schematically illustrating a battery pack according to an embodiment of the present invention. FIG. 2 is an exploded perspective view schematically illustrating constituent elements of the battery pack of FIG. 1, except for an insulation cover and a battery management system (BMS).

Referring to FIGS. 1 and 2, a battery pack according to the present embodiment may include a case 110, a plurality of battery units 120, an insulation plate 130, a plurality of bus bars 160, a printed circuit board (PCB) 170, an insulation cover 140, and a battery management system (BMS) 150.

The case 110 may have a substantially hexahedral shape with an open upper surface 113 for accommodating the battery units 120. The battery units 120 are accommodated in the case 110 to be parallel to one another. At least one lateral surface (lateral face) of the case 110 may be open to allow the battery units 120 to fluidly communicate with external air. For example, two oppositely disposed lateral surfaces of the case 110 may be open. The air introduced through a first opening 111 provided at one open lateral surface 110a of the case 110 may be exhausted outside through a second opening 112 (FIG. 2) provided at the other open lateral surface 110b by passing through the battery units 120 accommodated in the case 110. The case 110 may be formed of an insulation material.

Each of the battery units 120 has a plate shape and includes, as shown if FIG. 2, a frame 125, a battery cell 123 within frame 125, and first and second lead tabs 121 and 122 extending from one side of the frame 125. The battery units 120 may be accommodated in the case 110 with the first and second lead tabs 121 and 122 being exposed to the outside through the open upper surface 113 of the case 110 and extending in opposite directions.

The battery cell 123 may include, for example, a lithium-ion battery. The battery cell 123 may include an electrode assembly (not shown) in which a positive plate, a negative plate, and a plurality of separators interposed therebetween are stacked. To provide the battery units 120 of high output and high capacity, a plurality of positive plates, negative plates, and separators may be stacked.

The frame 125 may accommodate the battery cell 123. The frame 125 may be formed of an insulation material to secure insulation from the first and second lead tabs 121 and 122. For example, the frame 125 may be formed of a polymer resin material such as polyphenylene sulfide (PPS).

The first and second lead tabs 121 and 122 form interconnections with the outside of the battery cell 123 and may extend from one side of the battery cell 123 to guide current from the battery cell 123 to the outside. The first and second lead tabs 121 and 122 may extend toward one side, for example, an upper side, of the frame 125. The first and second lead tabs 121 and 122 may include a metal material exhibiting a superior conductivity, for example, aluminium (Al), copper (Cu), nickel (Ni), etc.

The first and second lead tabs 121 and 122 may have opposite polarities to each other. For example, the first and second lead tabs 121 and 122 may serve as a positive tab and a negative tab, respectively. To this end, the first and second lead tabs 121 and 122 may be electrically connected to a positive plate (not shown) and a negative plate (not shown) of an electrode assembly (not shown), respectively.

The first and second lead tabs 121 and 122 having the opposite polarities may be bent in the directions opposite to each other. The battery units 120 may be electrically connected using the first and second lead tabs 121 and 122. For example, the first lead tab 121 may be bent towards the front 110c of the case 110 (according to the illustrated front and rear directions) along which the battery units 120 are arranged, whereas the second lead tab 122 may be bent towards the rear 110d of case 110. The bending of the first and second lead tabs 121 and 122 pass through an opening OP outlined by a first rib 131 and a second rib 132 of the insulation plate 130.

When the battery units 120 are arranged in parallel with each other to form a battery module M, to allow the battery units 120 to be serially connected, the battery units 120 may be arranged with the first and second lead tabs 121 and 122 respectively facing the opposite tabs. That is, the neighboring battery units 120 are arranged so that the left and right sides of the first and second lead tabs 121 and 122 having the opposite polarities may be reversed. A pair of the battery units 120 neighboring each other may form electrical connection by connecting the first and second lead tabs 121 and 122 of the different battery units 120 bent to face each other. For the electrical connection between the battery units 120, coupling holes 121h and 122h may be formed in the first and second lead tabs 121 and 122.

The first and second lead tabs 121 and 122 bent to face each other may be folded on each other on the first rib 131 of the insulation plate 130 and serially connected by a first bus bar 161 provided on the first and second lead tabs 121 and 122. To this end, the first bus bar 161 may include a coupling hole 161ah for mechanically coupling the first and second lead tabs 121 and 122 using a fourth fixing member 184.

When the neighboring battery units 120 are arranged so that the left and right sides of the first and second lead tabs 121 and 122 having the opposite polarities may be reversed for the serial connection of the battery units 120, any one of the first and second lead tabs 121 and 122 of the battery units 120 located at the outermost position may not be folded on another lead tab. For example, the first lead tab 121 of one of the battery units 120 that is located at the foremost position and the second lead tab 122 of one of the battery units 120 that is located at the rearmost position do not have lead tabs to face each other.

Some of the bus bars 160 connected to the first lead tab 121 or the second lead tab 122 bent frontward or rearward may form a high current flow of a battery pack. For example, a second bus bar 162 may be electrically connected to the first lead tab 121, whereas a third bus bar 163 may be electrically connected to the second lead tab 122. To this end, the second and third burs bars 162 and 163 may respectively include coupling holes 162ah and 163ah to be mechanically coupled to the first and second lead tabs 121 and 122 using the fourth fixing member 184. The bus bars 160 may include a metal material exhibiting superior conductivity, for example, aluminium (Al), copper (Cu), nickel (Ni), etc.

The bus bars 160 may acquire cell balancing information of the battery units 120. The bus bars 160 may be electrically connected to the printed circuit board (PCB) 170 to acquire information about voltage of each of the battery units 120. To this end, the bus bars 160 may include coupling holes 161ch, 162ch, and 163ch to be mechanically coupled to the printed circuit board (PCB) 170 using a fifth fixing member 185.

The insulation plate 130 may be arranged to cover the open upper portion of the case 110 and mechanically coupled to the case 110 using first fixing member 181. The insulation plate 130 may support the first and second lead tabs 121 and 122 exposed to the upside of the case 110 and bent, and secure insulation between the bus bars 160.

To this end, the insulation plate 130 may include the first rib 131 to stably support the first and second lead tabs 121 and 122 and the bus bars 160, and a second rib 132 to support some of the bus bars 160 and the printed circuit board (PCB) 170 for acquiring balancing of each battery cell 123.

The first rib 131 may support the first and second lead tabs 121 and 122 bent frontward or rearward and the bus bars 160. The first rib 131 may form mechanical coupling with the fourth fixing member 184 that passes through the coupling holes 161 ah, 162ah, and 163ah of the bus bars 160 and the coupling holes 121h and 122h of the first and second lead tabs 121 and 122.

The second rib 132 may form mechanical coupling with the fifth fixing member 185 that passes through a coupling hole 170h of the printed circuit board (PCB) 170 and a coupling hole 160ch formed in the bus bars 160.

The insulation plate 130 may include first and second terminal members 135 and 136. The first and second terminal members 135 and 136 may protrude in one direction to form interconnection with the outside of the battery pack. When the battery module M is formed as the battery units 120 are electrically connected to one another, the second bus bar 162 connected to the first lead tab 121 located at the foremost position and the third bus bar 163 connected to the second lead tab 122 located at the rearmost position have the opposite polarities. For example, the second bus bar 162 may be a positive pole of the battery module M, whereas the third bus bar 163 may be a negative pole of the battery module M. The second bus bar 162 is connected to the first terminal member 135 and the third bus bar 163 is connected to the second terminal member 136, thereby forming a high current flow of the battery pack to provide power externally from the battery pack.

The Printed circuit board (PCB) 170 is accommodated on the insulation plate 130 and electrically connected to each of the bus bars 160 so as to sense a voltage of each of the battery units 120. The Printed circuit board (PCB) 170 may sense a voltage of the battery cell 123 of each of the battery units 120 to monitor whether a voltage difference among the battery cells 123 within an allowable range.

The voltage sensed by the printed circuit board (PCB) 170 may be transferred to the battery management system (BMS) 150 via a connector 175 formed on the printed circuit board (PCB) 170 and used for cell balancing. To this end, the battery management system (BMS) 150 may include a connector 155 that is connected to the connector 175 of the printed circuit board (PCB) 170 via a cable (not shown). The Battery management system (BMS) 150 may compare the voltage of each battery cell 123 with a reference voltage and, when the voltage of each battery cell 123 is greater than the reference voltage, discharge is performed on the battery cell 123 having a voltage exceeding the reference voltage via a discharge path formed corresponding to each battery cell 123, thereby achieving cell balancing.

The insulation cover 140 may be arranged to cover the insulation plate 130. The insulation cover 140 may be arranged in a state in which the first and second lead tabs 121 and 122 and the bus bars 160 are stably coupled via the insulation plate 130 and the printed circuit board (PCB) 170 is accommodated thereon. A second fixing member 182 may be bolt coupled to an upper portion of the insulation plate 130 by passing through a coupling hole 142 formed in the insulation cover 140.

The insulation cover 140 may prevent short circuit by spatially separating the first and second terminal members 135 and 136 forming the high current flow. To this end, the insulation cover 140 may include recess portions 145 and 146 for accommodating the first and second lead tabs 121 and 122. Also, the insulation cover 140 may prevent short circuit by spatially separating the bus bars 160 supported on the insulation plate 130.

A space for accommodating the battery management system (BMS) 150 is provided on an upper surface of the insulation cover 140. A third fixing member 183 may be coupled to a coupling hole 143 by passing through the battery management system (BMS) 150. For example, a bolt may be used as the third fixing member 183. The Battery management system (BMS) 150 includes the connector 155 capable of communicating with the printed circuit board (PCB) 170. An opening 141 may be provided in the insulation cover 140 so that the cable connecting the connector 175 of the printed circuit board (PCB) 170 and the connector 155 of the battery management system (BMS) 150 may pass through the opening 141.

Although it is not illustrated in the drawing, an outer cover may be further provided on the insulation cover 140 to protect the battery management system (BMS) 150. The insulation cover 140 as an inner cover may be coupled to the outer cover through a fixing member such as a bolt.

Figure 3:
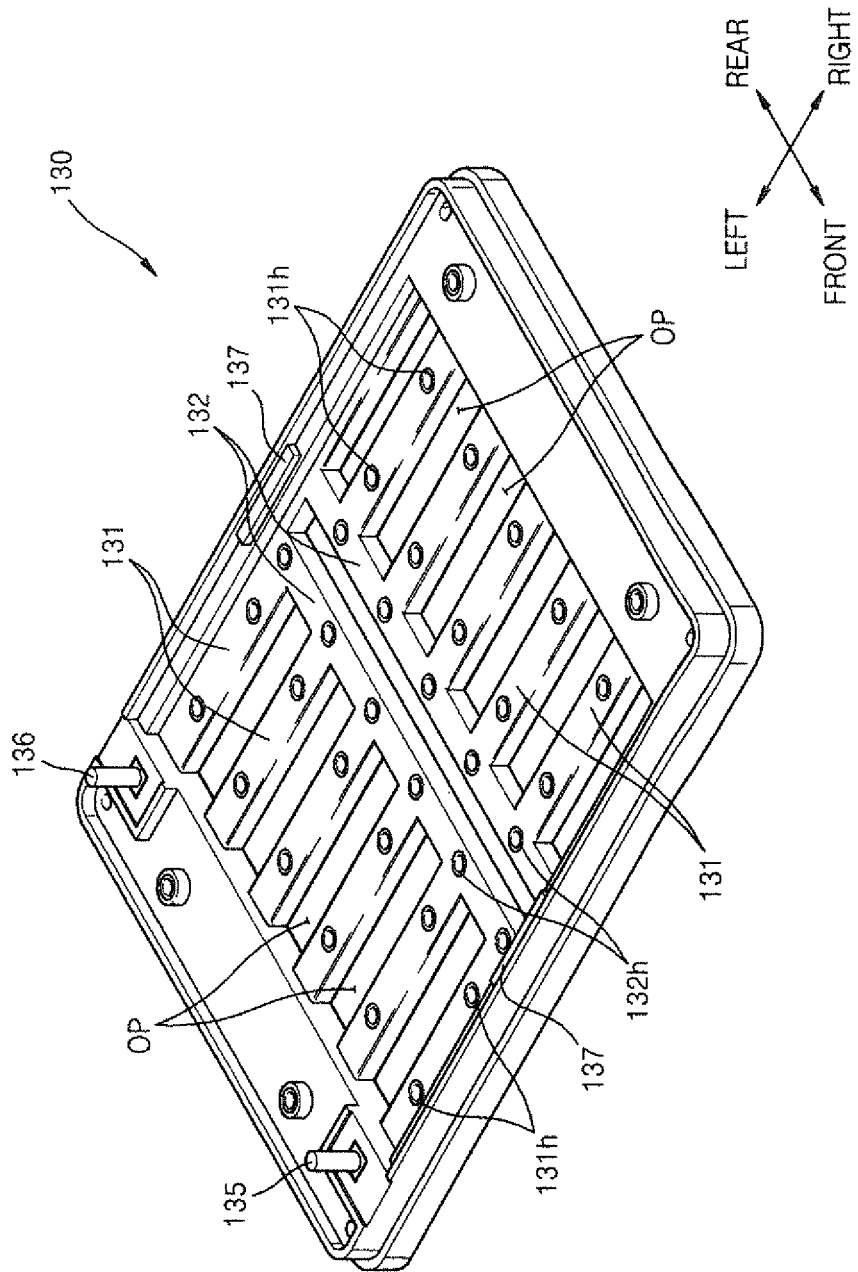
FIG. 3 is a perspective view schematically illustrating an insulation plate.

FIG. 3 is a perspective view schematically illustrating the insulation plate 130.

Referring to FIG. 3, the insulation plate 130 may include a plurality of the first ribs 131 extending in an illustrated left and right direction and a plurality of the second ribs 132 extending in the illustrated front and rear direction. The second ribs 132 may extend to across the center of the insulation plate 130. The first ribs 131 that extend perpendicularly to the second ribs 132 may be arranged parallel to one another at both sides of the second ribs 132.

As the first ribs 131 are separated from one another in the front and rear direction, the opening OP through which the first and second lead tabs 121 and 122 pass may be formed. The width of the opening OP may be equal to or larger than the width of the first and second lead tabs 121 and 122 so that the first and second lead tabs 121 and 122 may pass through the opening OP.

The first ribs 131 support the first and second lead tabs 121 and 122. For example, the first and second lead tabs 121 and 122 respectively provided at the neighboring battery units 120 may be exposed to the outside by passing through the openings OP formed at both sides of one of the first ribs 131. The first and second lead tabs 121 and 122 passing through the openings OP may be bent in directions facing each other and supported by the first ribs 131. The first ribs 131 may simultaneously support the first and second lead tabs 121 and 122 or any one of the first and second lead tabs 121 and 122.

Also, the first ribs 131 may support the bus bars 160 and have a plurality of coupling holes 131h for coupling to the fourth fixing member 184.

The second rib 132 may extend along a lengthwise direction of the printed circuit board (PCB) 170 to accommodate the printed circuit board (PCB) 170. For example, the fifth fixing member 185 may be coupled to the second rib 132 by passing through the printed circuit board (PCB) 170. To this end, a plurality of coupling holes 132h may be provided in the second rib 132. A spacer 137 to guide an accommodation position of the printed circuit board (PCB) 170 and prevent a movement of the printed circuit board (PCB) 170 may be provided at both ends of the second rib 132.

Although in the present embodiment the first ribs 131 and the second rib 132 are formed to the same height, the present invention is not limited thereto. For example, the second rib 132 may extend as high as the height of the upper surface of the spacer 137 to be higher than the first ribs 131.

The first and second terminal members 135 and 136 may protrude upwardly to induce current from the battery pack to the outside. The first and second terminal members 135 and 136 may include a metal material exhibiting superior conductivity. For example, the first and second terminal members 135 and 136 may include a material such as aluminium (Al), copper (Cu), nickel (Ni), etc.

Figure 4A:
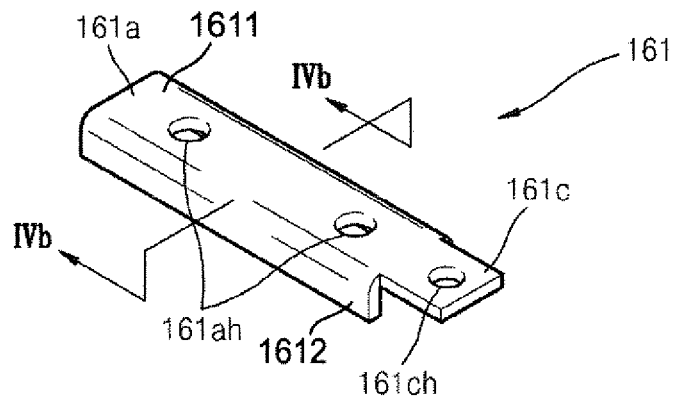
FIG. 4A is a perspective view of a first bus bar.
Figure 4B:
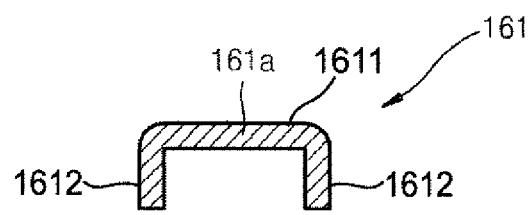
FIG. 4B is a cross-sectional view taken along line IVb-IVb of FIG. 4A.
Figure 5A:
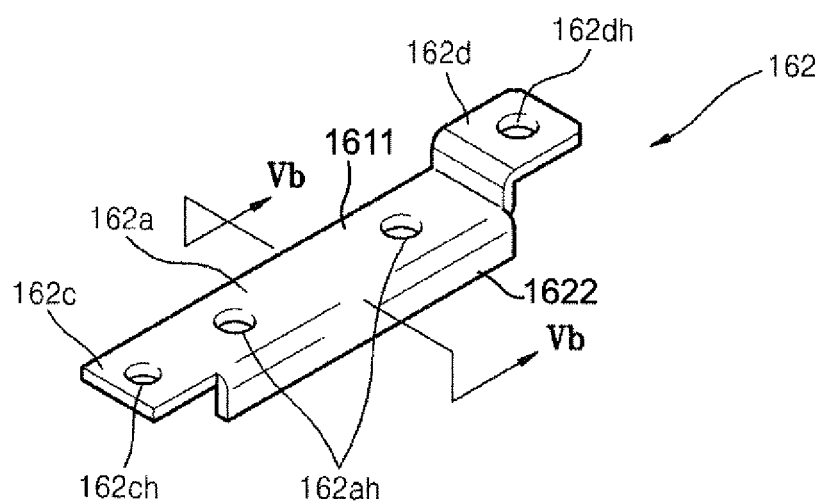
FIG. 5A is a perspective view of a second bus bar.
Figure 5B:
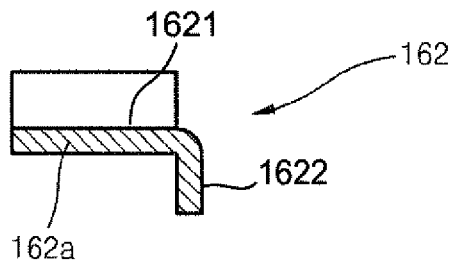
FIG. 5B is a cross-sectional view taken along line Vb-Vb of FIG. 5A.
Figure 6A:
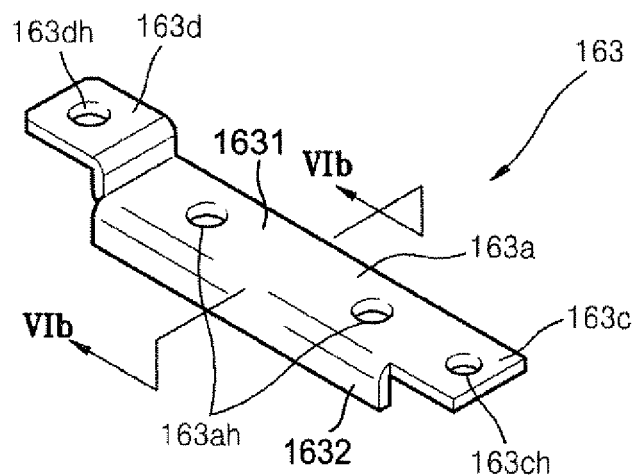
FIG. 6A is a perspective view of a third bus bar.
Figure 6B:
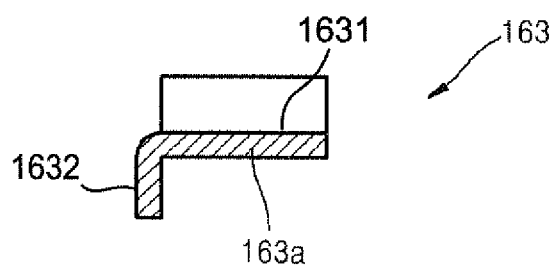
FIG. 6B is a cross-sectional view taken along line VIb-VIb of FIG. 6A.

FIGS. 4A through 6B illustrate the bus bars 160 according to an embodiment of the present invention. FIG. 4A is a perspective view of the first bus bar 161. FIGS. 5A and 6A are perspective views of the second and third bus bars 162 and 163. FIGS. 4B, 5B, and 6B are cross-sectional views taken along lines IVb-IVb, Vb-Vb, and VIb-VIb of FIGS. 4A, 5A, and 6A, respectively.

Referring to FIGS. 4A and 4B, the first bus bar 161 may include a main body portion 161a, and a cell balancing portion 161c. The main body portion 161a may include an upper portion 1611 and side walls 1612 extending downwardly from both sides of the upper portion 1611, to wrap the first and second lead tabs 121 and 122 bent on the first rib 131. The upper portion 1611 of the main body portion 161a may contact the bent first and second lead tabs 121 and 122 supported by the first rib 131, and the side walls provided at both sides of the main body portion 161a may respectively cover the first and second lead tabs 121 and 122.

The main body portion 161a may be coupled to the first rib 131 with the bent first and second lead tabs 121 and 122 interposed therebetween. To this end, the main body portion 161a may include the coupling hole 161 ah formed at a position corresponding to the coupling hole 131h that is formed in the first rib 131.

The cell balancing portion 161c may protrude from one end of the main body portion 161a to transmit voltage information of the battery cell 123 included in each of the battery units 120 to the printed circuit board (PCB) 170. To this end, the cell balancing portion 161c may include the coupling hole 161*ch* for connection to the printed circuit board (PCB) 170 and second rib 132, with coupling hole 161*ch* of cell balancing portion 161*c* corresponding to coupling hole 132*h* of second rib 132 and coupling hole 170*h* of printed circuit board (PCB) 170.

Referring to FIGS. 5A and 5B, the second bus bar 162 may include a main body portion 162*a*, a cell balancing portion 162*c*, and a high current portion 162*d*. The main body portion 162*a* may include an upper portion 1621 and a side wall 1622 extending downwardly from one side of the upper portion 1621 to wrap the first lead tab 121 bent on the first rib 131. The upper portion 1621 of the main body portion 162*a* may contact the bent first lead tab 121 supported by the first rib 131, and the side wall 1622 may partially cover the first lead tab 121 that is not placed on the first rib 131.

The main body portion 162*a* may be coupled to the first rib 131 with the bent first lead tab 121 interposed therebetween. To this end, the main body portion 162*a* may include the coupling hole 162*ah* formed at a position corresponding to the coupling hole 131*h* that is formed in the first rib 131.

The cell balancing portion 162*c* may protrude from a first end of the main body portion 162*a* to transmit voltage information of the battery cell 123 included in each of the battery units 120 to the printed circuit board (PCB) 170. To this end, the cell balancing portion 162*c* may include the coupling hole 162*ch* for connection to the printed circuit board (PCB) 170.

The high current portion 162*d* may protrude from a second end of the main body portion 162*a* and include a through hole 162*dh* for coupling to the first terminal member 135. As the first terminal member 135 is inserted into the through hole 162*dh*, the high current portion 162*d* may be electrically connected to the first terminal member 135 in contact with the same.

Referring to FIGS. 6A and 6B, the third bus bar 163 may include a main body portion 163*a*, a cell balancing portion 163*c*, and a high current portion 163*d*. The main body portion 163*a* may include an upper portion 1631 and a side wall 1632 extending downwardly from one side of the upper portion 1631 to wrap the second lead tab 122 bent on the first rib 131. The upper portion 1631 of the main body portion 163*a* may contact the bent second lead tab 122 supported by the first rib 131, and the side wall 1632 may partially cover the second lead tab 122 that is not placed on the first rib 131.

The main body portion 163*a* may be coupled to the first rib 131 with the bent second lead tab 122 interposed therebetween. To this end, the main body portion 163*a* may include the coupling hole 163*ah* formed at a position corresponding to the coupling hole 131*h* that is formed in the first rib 131.

The cell balancing portion 163*c* may protrude from a first end of the main body portion 163*a* to transmit voltage information of the battery cell 123 included in each of the battery units 120 to the printed circuit board (PCB) 170. To this end, the cell balancing portion 163*c* may include the coupling hole 163*ch* for connection to the printed circuit board (PCB) 170.

The high current portion 163*d* may protrude from a second end of the main body portion 163*a* and include a through hole 163*dh* for coupling to the second terminal member 136. As the second terminal member 136 is inserted into the through hole 163*dh*, the high current portion 163*d* may be electrically connected to the second terminal member 136 in contact with the same.

Although in FIGS. 4A through 6B the main body portions 161*a*, 162*a*, and 163*a* and the cell balancing portions 161*c*, 162*c*, and 163*c* are illustrated as having the same height, the present invention is not limited thereto. For example, when the second rib 132 is formed to be higher than the first rib 131 in the insulation plate 130 described with reference to FIG. 3, the cell balancing portions 161*c*, 162*c*, and 163*c* may be formed to be higher than the main body portions 161*a*, 162*a*, and 163*a* according to the height of the second rib 132.

The connections between the first and second lead tabs 121 and 122, the bus bars 160, and the printed circuit board (PCB) 170 using the insulation plate 130 are described below with reference to FIGS. 7 through 11.

Figure 7:
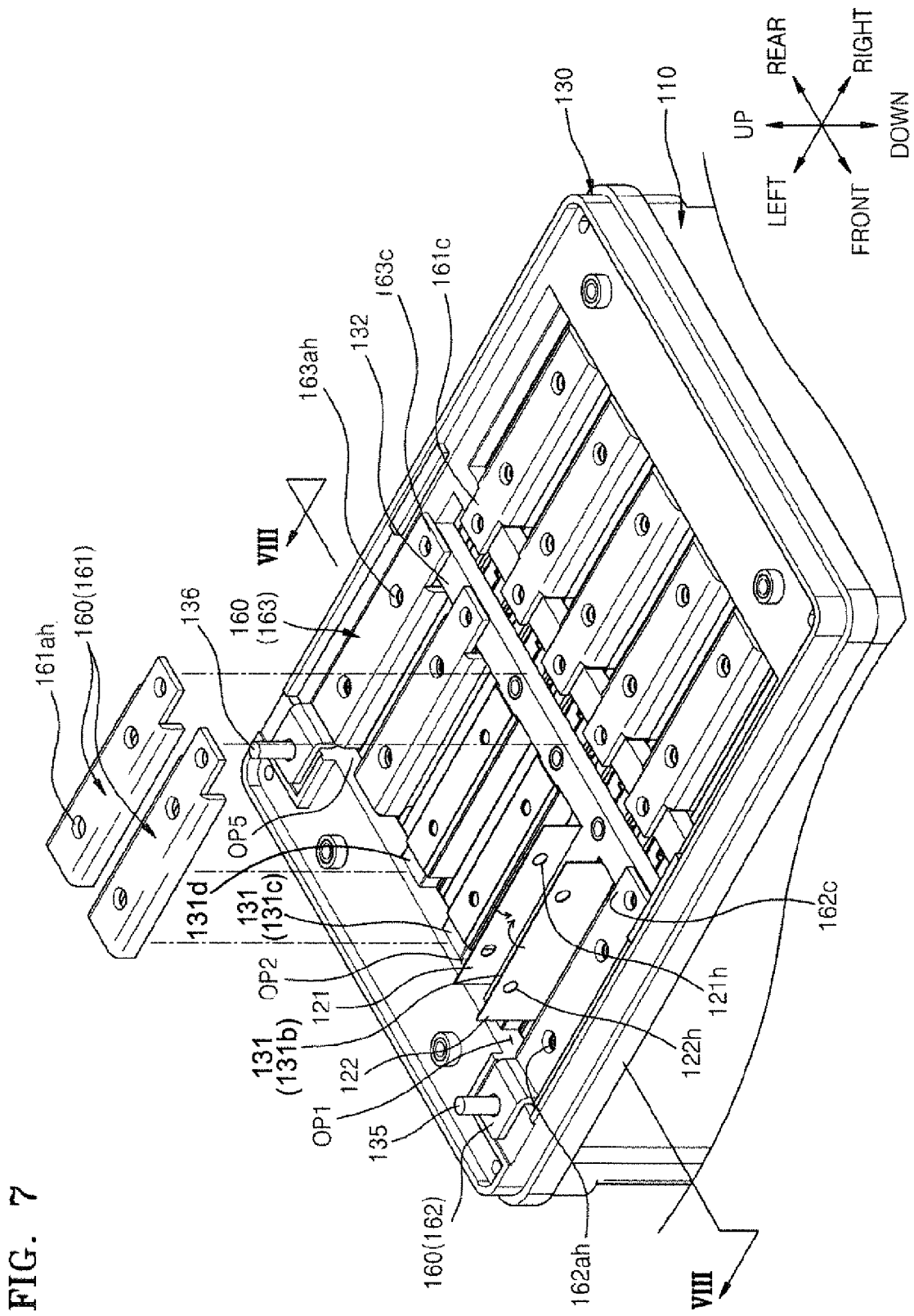
FIG. 7 is a perspective view schematically illustrating an insulation plate and a bus bar arranged in an upper portion of a case when battery units are accommodated in the case.
Figure 8:
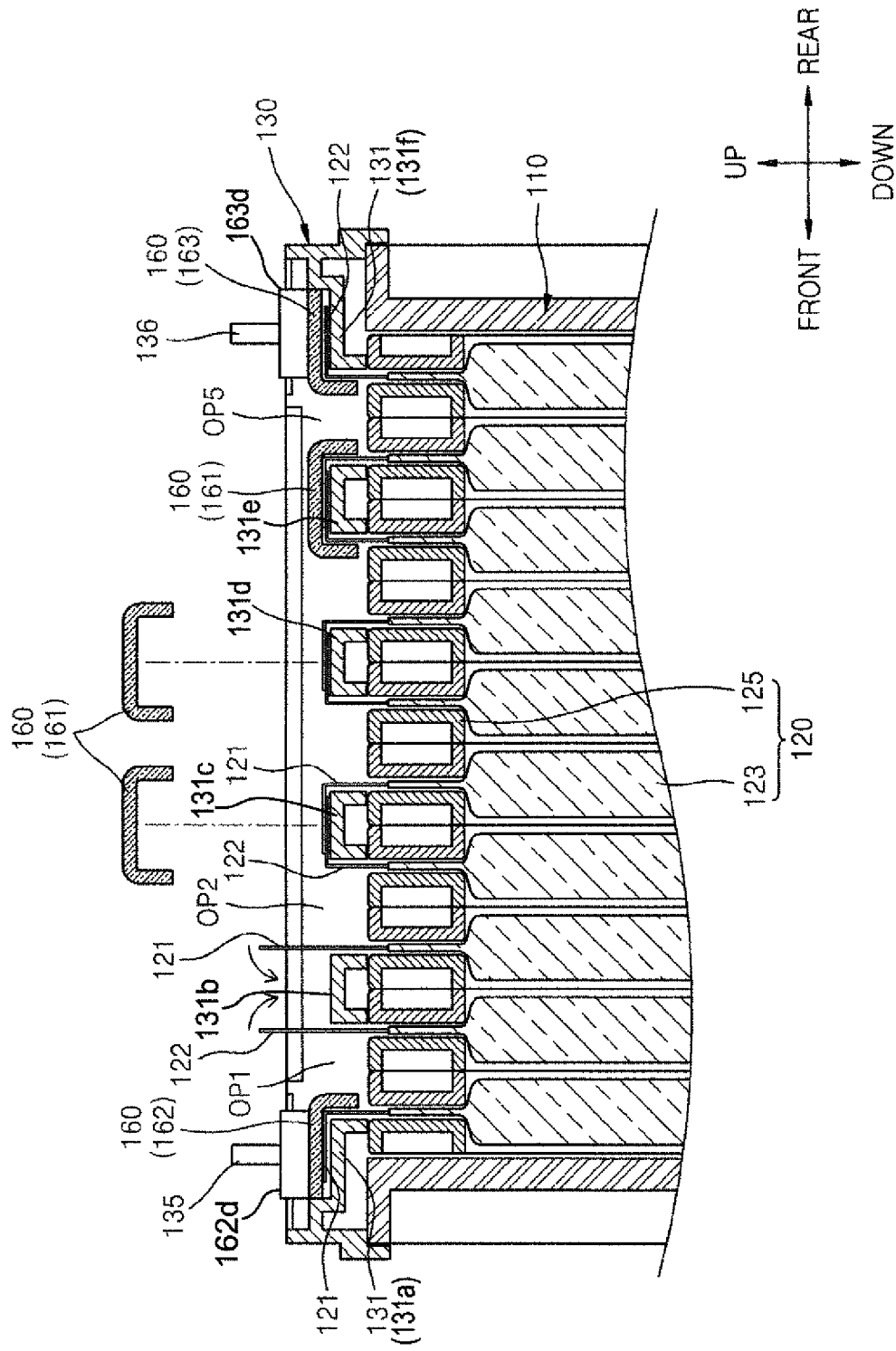
FIG. 8 is a cross-sectional view taken along line VIII-VIII of FIG. 7.
Figure 9:
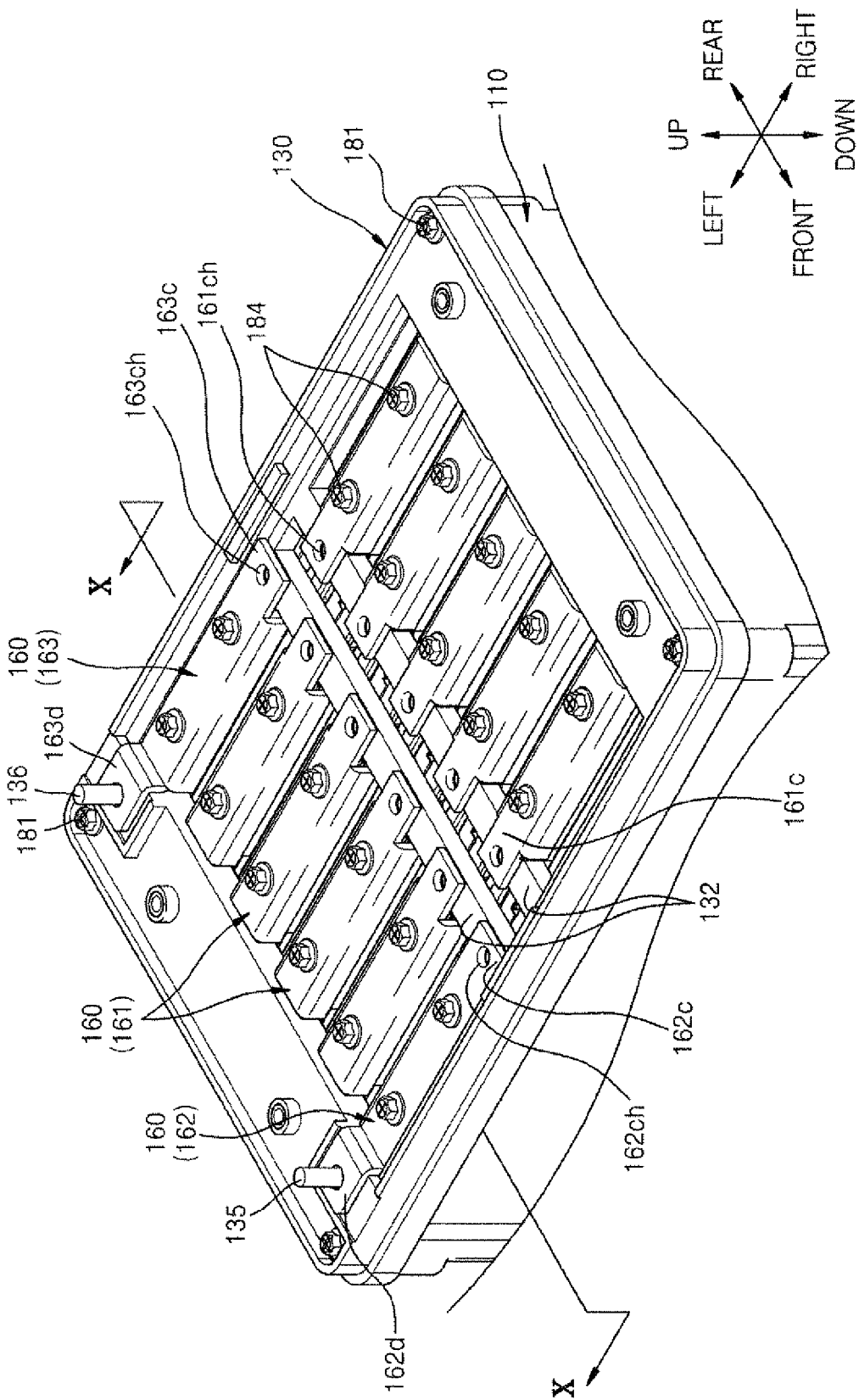
FIG. 9 is a perspective view schematically illustrating a state in which first and second lead tabs and a bus bar are coupled to each other on an insulation plate.
Figure 10:
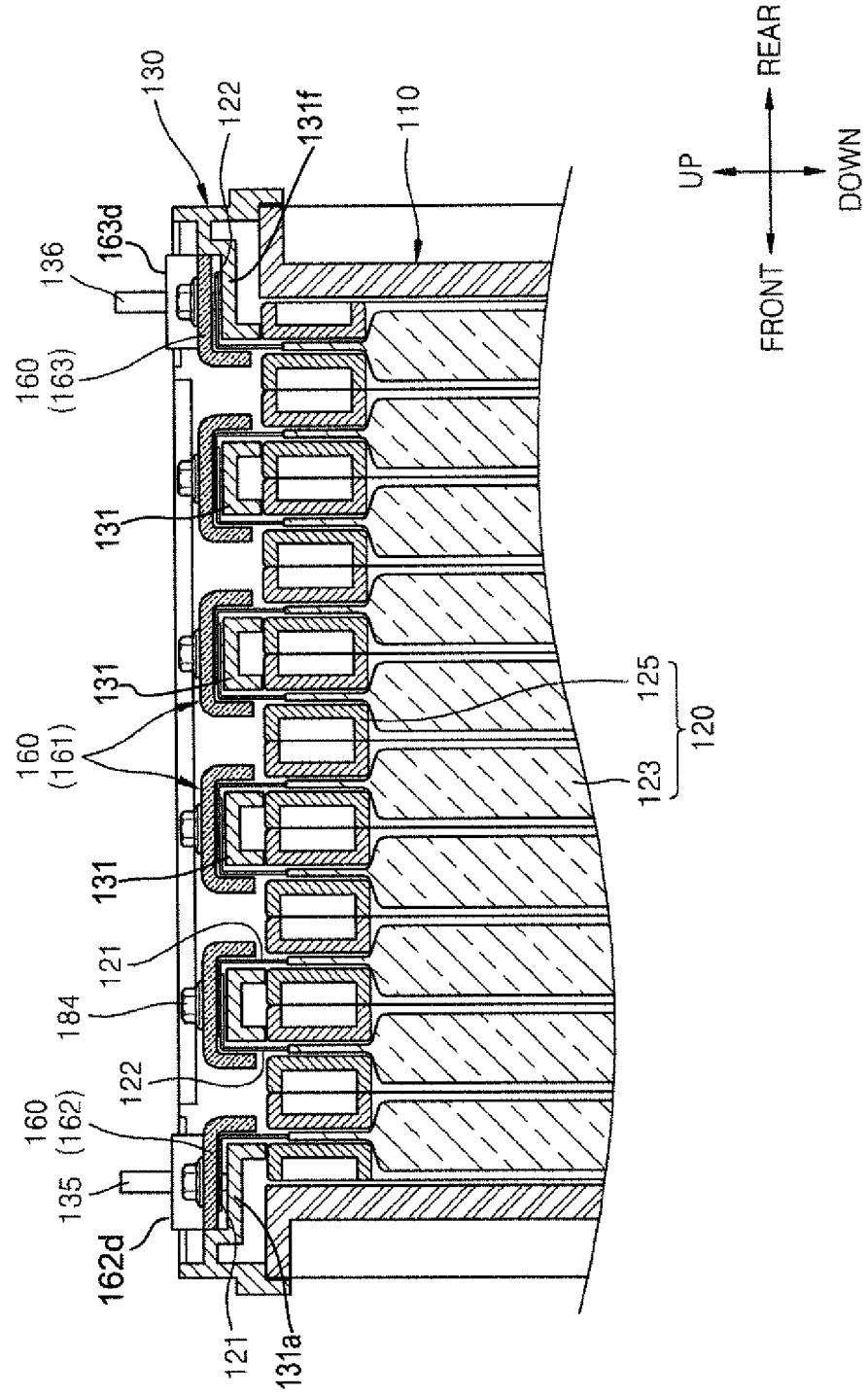
FIG. 10 is a cross-sectional view taken along line X-X of FIG. 9.

FIG. 7 is a perspective view schematically illustrating the insulation plate 130 and the bus bars 160 (i.e., bus bars 161, 162 and 163) arranged in an upper portion of the case 110 when the battery units 120 are accommodated in the case 110. FIG. 8 is a cross-sectional view taken along line VIII-VIII of FIG. 7. FIG. 9 is a perspective view schematically illustrating a state in which the first and second lead tabs 121 and 122 and the bus bars 160 are coupled to each other on the insulation plate 130. FIG. 10 is a cross-sectional view taken along line X-X of FIG. 9.

Referring to FIGS. 7 and 8, the insulation plate 130 may be arranged on the case 110 such that the openings OP1 and OP2 can each correspond to both lead tabs 121 and 122 extending from the battery unit 120.

As shown in FIG. 8, the lead tabs 122 and 121 extending from the neighboring battery units 120 may be exposed to the outside by passing through the openings OP1 and OP2, respectively, provided at both sides of the second rib 131*b*. The lead tabs 122 and 121 exposed to the outside may be bent toward each other on the second rib 131*b*.

The lead tab 121 extending through the opening OP1 provided at the foremost position is bent towards the front and accommodated on the first rib 131 (131*a*). The lead tab 122 extending through an opening OP5 provided at the rearmost position is bent towards the rear and accommodated on the sixth rib 131 (131*f*).

The bent lead tabs 121 and 122 are shown folded over each other on the ribs 131 (e.g., second rib 131*c* in FIG. 8), thereby serially connecting the neighboring battery units 120. The holes 121*h* formed in the lead tab 121 and the holes 122*h* formed in the lead tab 122 may be aligned with the holes 131*h* formed in the ribs 131.

Then, the bus bars 160 (161) may be accommodated on the ribs 131*c* and 131*d*.

For example, the bus bars 160 may be arranged on the lead tab 121 and/or the lead tab 122 that are accommodated on the ribs 131. The cell balancing portion 161*c* of each of the bus bars 161 may be accommodated on the second rib 132. The hole 161*ah* formed in each of the bus bars 161 may be aligned with the holes 121*h* and 122*h* of the lead tabs 121 and 122 and the hole 131*h* of the rib 131.

Referring to FIGS. 9 and 10, the bus bar 161 may be accommodated on the lead tabs 121 and 122 folded over each other on the rib 131, the bus bar 162 may be accommodated on the lead tab 121 that is accommodated on the rib 131*a*, and the bus bar 163 may be accommodated on the second lead tab 122 that is accommodated on the rib 131*f*. The high current portions 162*d* and 163*d* of bus bars 162 and 163 may be coupled to the first and second terminal members 135 and 136, respectively.

Referring to FIGS. 7 through 10, the bus bar 161 may be fixed on the rib 131 by the fourth fixing member 184. The fourth fixing member 184 may be coupled to the rib 131 by passing through the hole 161*ah* formed in the bus bar 161 and the holes 121*h* and 122*h* formed in the lead tabs 121 and 122. A bolt may be used as the fourth fixing member 184.

The bus bar 162 may be fixed on the rib 131*a* using the fourth fixing member 184. The fourth fixing member 184 may be coupled to the rib 131*a* by passing through the hole 162*ah* formed in the bus bar 162 and the hole 121*h* formed in the lead tab 121. The bus bar 163 may be fixed on the rib 131*f* using the fourth fixing member 184.

The side walls of the bus bars 160 extend downwardly and cover most of the vertical portions of lead tabs 121 and 122 extending outward from frame 25, so that the bus bars 160 may protect the lead tabs 121 and 122. since the ribs 131 formed on the insulation plate 130 are separated from each other and the lead tabs 121 and 122 and the bus bars 160 are coupled to the ribs 131 using the fourth fixing member 184, the connection therebetween may be stably maintained and short-circuits between the bus bars 160 and between the lead tabs 121 and 122 may be prevented.

Figure 11:
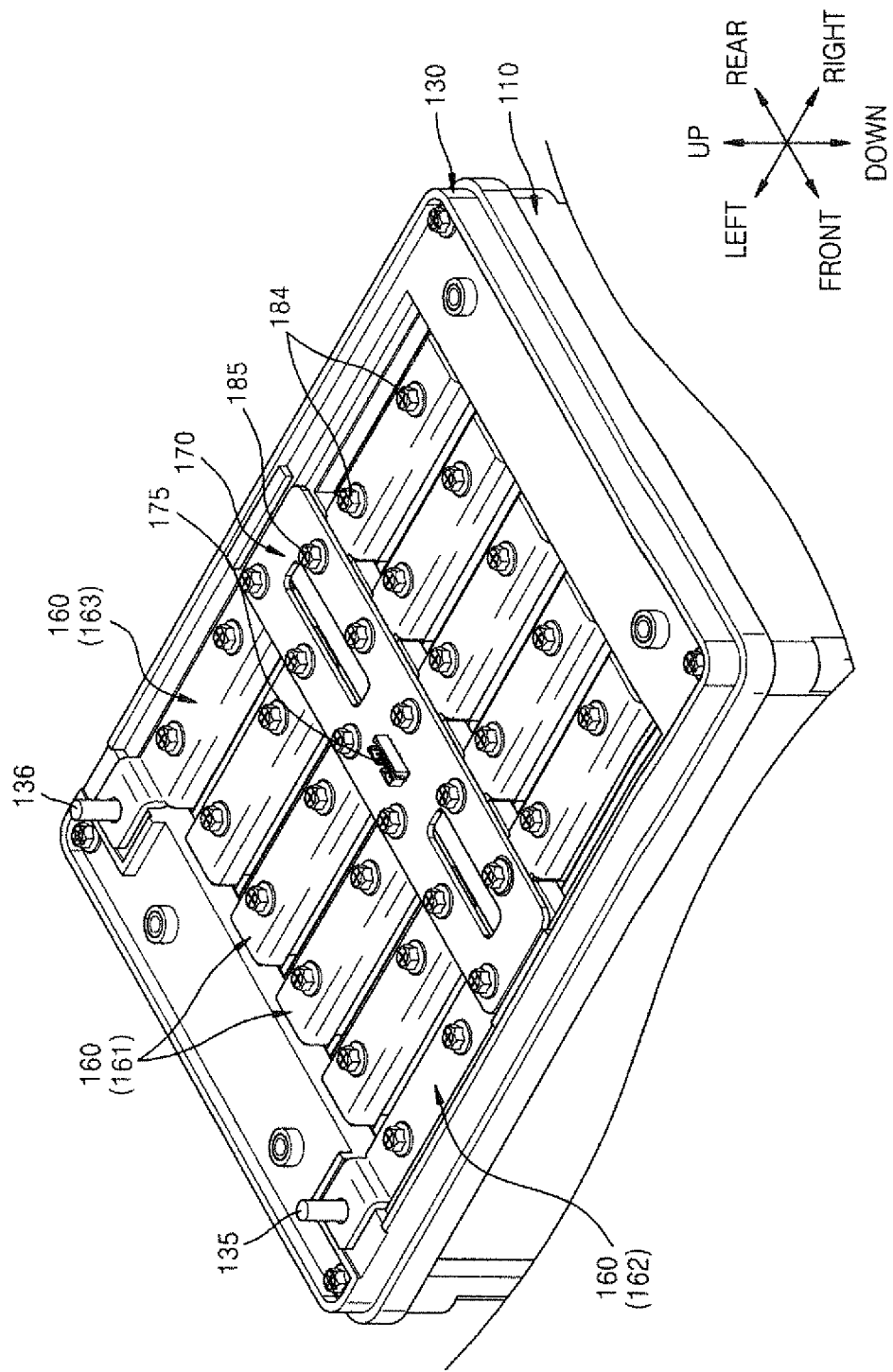
FIG. 11 is a perspective view schematically illustrating a state in which a printed circuit board (PCB) is accommodated on a bus bar.

FIG. 11 is a perspective view schematically illustrating a state in which the printed circuit board (PCB) 170 is accommodated on the bus bars 160 above ribs 132.

Referring to FIGS. 9 through 11, the printed circuit board (PCB) 170 is arranged to cover the cell balancing portions 161*c*, 162*c* and 163*c* of the bus bars 161, 162 and 163 accommodated on the ribs 132. The cell balancing portions 161*c*, 162*c* and 163*c* may be electrically connected to a lower surface of the printed circuit board (PCB) 170 in contact with the same. To this end, the printed circuit board (PCB) 170 may be fixed on the ribs 132 of insulation plate 130 using the fifth fixing member 185. The holes 161*ch*, 162*ch* and 163*ch* formed in the cell balancing portions 161*c*, 162*c* and 163*c* may be aligned with the holes 132*h* of the ribs 132. The fifth fixing member 185 may be coupled to the ribs 132 by passing through the printed circuit board (PCB) 170 and the cell balancing portions 161*c*, 162*c* and 163*c*.

The voltage information of the battery cell 123 acquired through each cell balancing portions 161*c*, 162*c* and 163*c* is converged on the connector 175 via a wiring formed in the printed circuit board (PCB) 170 and is transferred to the battery management system (BMS) 150 via a cable (not shown) connected between connector 175 of printed circuit board (PCB) 170 and connector 155 of the battery management system (BMS), as described above.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
   a battery module disposed inside a case, the battery module including a plurality of battery units, each including first and second lead tabs protruding outside of each battery unit, each of the first and second lead tabs having bent portions;
   an insulation plate connected to the case, the insulation plate including a plurality of first ribs, wherein the bent portions of the first and second lead tabs extend over the first ribs; and
   a plurality of bus bars disposed to cover each the lead tabs and electrically connect the battery units with each other, the bus bars being fixed to the first ribs.

2. The battery pack as set forth in claim 1, each battery unit comprising:
   a battery cell; and
   a frame surrounding the battery cell, the first and second lead tabs extending from one side of the frame.

3. The battery pack as set forth in claim 1, the insulation plate further including:
   at least one second rib, the plurality of first ribs extending orthogonally from the second rib;
   a plurality of openings outlined by the first ribs and the second rib, the first and second lead tabs extending through the openings and bent over adjacent ones of the first ribs; and
   a plurality of coupling holes formed in each of the first and second ribs, the bus bars being fixed to the first and second ribs.

4. The battery pack as set forth in claim 1, the plurality of bus bars comprising:
   a plurality of first bus bars having a first shape;
   a second bus bar having a second shape different from the first shape; and
   a third bus bar having a third shape different from the first and second shapes.

5. The battery pack as set forth in claim 4, each of the first bus bars comprising:
   a main body portion having at least one coupling hole therein;
   a cell balancing portion extending from a first end of the main body portion, the cell balancing portion having at least one coupling hole therein;
   a first side wall extending downwardly from a first side of the main body portion to wrap a predetermined one of the first lead tabs; and
   a second side wall extending downwardly from a second side of the main body portion to wrap a predetermined one of the second lead tabs.

6. The battery pack as set forth in claim 4, the second bus bar comprising:
   a main body portion having at least one coupling hole therein;
   a cell balancing portion extending from a first end of the main body portion, the cell balancing portion having at least one coupling hole therein;
   a high current portion extending from a second end of the main body portion, and in a different plane than the main body portion, the high current portion having at least one coupling hole therein; and
   a single side wall extending downwardly from one side of the main body portion to wrap a predetermined one of the first lead tabs.

7. The battery pack as set forth in claim 6, the third bus bar comprising:
   a main body portion having at least one coupling hole therein;
   a cell balancing portion extending from a first end of the main body portion, the cell balancing portion having at least one coupling hole therein;
   a high current portion extending from a second end of the main body portion, and in a different plane than the main body portion, the high current portion having at least one coupling hole therein; and
   a single side wall extending downwardly from one side of the main body portion to wrap a predetermined one of the second lead tabs.

8. The battery pack as set forth in claim 7, further comprising:
   first and second terminal members extending from the insulation plate to provide power externally from the battery pack, the first terminal member passing through the coupling hole of the high current portion of the second bus bar, and the second terminal member passing through the coupling hole of the high current portion of the third bus bar.

9. The battery pack as set forth in claim 4, the third bus bar comprising:

a main body portion having at least one coupling hole therein;
  a cell balancing portion extending from a first end of the main body portion, the cell balancing portion having at least one coupling hole therein;
  a high current portion extending from a second end of the main body portion, and in a different plane than the main body portion, the high current portion having at least one coupling hole therein; and
  a single side wall extending downwardly from one side of the main body portion to wrap a predetermined one of the second lead tabs.

10. The battery pack as set forth in claim 1, further comprising:
  a printed circuit board providing information to a battery management system, the printed circuit board having a plurality of coupling holes for enabling the printed circuit board to be electrically connected to the plurality of bus bars and for enabling the printed circuit board to be fixed to the insulation plate.

11. The battery pack as set forth in claim 10, the insulation plate further including:
  at least one second rib, the plurality of first ribs extending orthogonally from the second rib;
  a plurality of openings outlined by the first ribs and the second rib, the first and second lead tabs extending through the openings and bent over adjacent ones of the first ribs; and
  a plurality of coupling holes formed in each of the first and second ribs, the bus bars being fixed to the first ribs with a portion of each of the first and second lead tabs being fixed between the bus bars and the first ribs, and the printed circuit board being fixed to the second rib with a portion of each bus bar being fixed between the printed circuit board and the second rib.

12. The battery pack as set forth in claim 1, the case comprising:
  a plurality of lateral surfaces surrounding the battery module;
  a first opening in a first one of the lateral surfaces and a second opening in a second one of the lateral surfaces, the first and second openings being parallel to each other to enable air to pass through the case, the air being channeled between each of the battery units.

13. A battery pack comprising:
  a battery module disposed inside a case, the battery module including a plurality of battery units, each including first and second lead tabs protruding outside of each battery unit, each of the first and second lead tabs having bent portions;
  an insulation plate connected to the case, the insulation plate including a plurality of first ribs, wherein the bent portions of the first and second lead tabs extend over the first ribs; and
  a plurality of first bus bars disposed to respectively cover predetermined pairs of the first and second lead tabs and electrically connect the battery units with each other, the bus bars being fixed to the first ribs.

14. A battery pack as set forth in claim 13, further comprising:
  a second bus bar disposed to cover a predetermined one of the first lead tabs, the second bus bar being further connected to a first external terminal.

15. The battery pack as set forth in claim 14, the second bus bar comprising:
  a main body portion having at least one coupling hole therein;
  a cell balancing portion extending from a first end of the main body portion, the cell balancing portion having at least one coupling hole therein;
  a high current portion extending from a second end of the main body portion, and in a different plane than the main body portion, the high current portion having at least one coupling hole therein; and
  a single side wall extending downwardly from one side of the main body portion to wrap a predetermined one of the first lead tabs.

16. A battery pack as set forth in claim 14, further comprising:
  a third bus bar disposed to cover a predetermined one of the second lead tabs, the third bus bar being further connected to a second external terminal.

17. The battery pack as set forth in claim 16, the third bus bar comprising:
  a main body portion having at least one coupling hole therein;
  a cell balancing portion extending from a first end of the main body portion, the cell balancing portion having at least one coupling hole therein;
  a high current portion extending from a second end of the main body portion, and in a different plane than the main body portion, the high current portion having at least one coupling hole therein; and
  a single side wall extending downwardly from one side of the main body portion to wrap a predetermined one of the second lead tabs.

18. The battery pack as set forth in claim 16, the insulation plate further including:
  at least one second rib, the plurality of first ribs extending orthogonally from the second rib;
  a plurality of openings outlined by the first ribs and the second rib, the first and second lead tabs extending through the openings and bent over adjacent ones of the first ribs;
  a plurality of coupling holes formed in each of the first and second ribs, the first bus bars being fixed to the first and second ribs; and
  the first and second terminal members extending from the insulation plate to provide power externally from the battery pack.

19. The battery pack as set forth in claim 18, further comprising:
  a printed circuit board providing information to a battery management system, the printed circuit board having a plurality of coupling holes for enabling the printed circuit board to be electrically connected to each of the bus bars and for enabling the printed circuit board to be fixed to the insulation plate.

20. A battery pack as set forth in claim 13, each of the first bus bars comprising:
  a main body portion having at least one coupling hole therein;
  a cell balancing portion extending from a first end of the main body portion, the cell balancing portion having at least one coupling hole therein;
  a first side wall extending downwardly from a first side of the main body portion to wrap a predetermined one of the first lead tabs; and
  a second side wall extending downwardly from a second side of the main body portion to wrap a predetermined one of the second lead tabs.

* * * * *